United States Patent
Zhang et al.

(10) Patent No.: US 11,003,190 B2
(45) Date of Patent: May 11, 2021

(54) METHODS AND SYSTEMS FOR DETERMINING POSITIONAL OFFSET ASSOCIATED WITH A ROAD SIGN

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 165 days.

(21) Appl. No.: 16/219,399

(22) Filed: Dec. 13, 2018

(65) Prior Publication Data

US 2020/0192397 A1    Jun. 18, 2020

(51) Int. Cl.
  *G05D 1/02*  (2020.01)
  *G06K 9/00*  (2006.01)
  *G05D 1/00*  (2006.01)

(52) U.S. Cl.
  CPC ......... *G05D 1/0246* (2013.01); *G05D 1/0088* (2013.01); *G05D 1/0221* (2013.01); *G06K 9/00798* (2013.01); *G06K 9/00818* (2013.01)

(58) Field of Classification Search
  CPC .................................................. G01D 1/0246
  See application file for complete search history.

(56) References Cited

U.S. PATENT DOCUMENTS

2016/0170414 A1*  6/2016  Chen .................. G08G 1/0112
                                                                                701/27
2018/0045516 A1   2/2018  Sumizawa
                    (Continued)

FOREIGN PATENT DOCUMENTS

CN        107703528 A    2/2018
KR        20140061156 A  5/2014
WO        2008135604 A1  11/2008

OTHER PUBLICATIONS

Ai et al., "Critical Assessment of an Enhanced Traffic Sign Detection Method Using Mobile Lidar and Ins Technologies", Article, published in Journal of Transportation Engineering, Dec. 2014, pp. 1-47.

*Primary Examiner* — Alex C Dunn
(74) *Attorney, Agent, or Firm* — Ditthavong, Steiner, & Mlotkowski

(57) ABSTRACT

A method, system and computer program product for determining a positional offset associated with a location of a road sign are disclosed herein. The method comprises obtaining a first plurality of road sign observations of the road sign captured by a plurality of vehicles, wherein the first plurality of road sign observations comprise location data of the plurality of vehicles, heading data of the plurality of vehicles, and speed data of the plurality of vehicles. The method further comprises computing, by a processor, a plurality of longitudinal offsets between at least a second plurality of road sign observations of the first plurality of road sign observations and ground truth data associated with the road sign. Further, the method comprises deriving, by the processor, a function, based on the plurality of longitudinal offsets and the speed data in the at least second plurality of road sign observations, and determining, by the processor, the positional offset associated with the location of the road sign, based on a learned heading and the derived function, wherein the learned heading is based on the heading data of the plurality of vehicles.

20 Claims, 9 Drawing Sheets

(56) References Cited

U.S. PATENT DOCUMENTS

| | | | |
|---|---|---|---|
| 2019/0236862 A1* | 8/2019 | Mercep | G05D 1/0088 |
| 2019/0236865 A1* | 8/2019 | Mercep | G05D 1/0274 |
| 2020/0050973 A1* | 2/2020 | Stenneth | G01C 21/32 |
| 2020/0096358 A1* | 3/2020 | Dal Bo | G06Q 30/0266 |

* cited by examiner

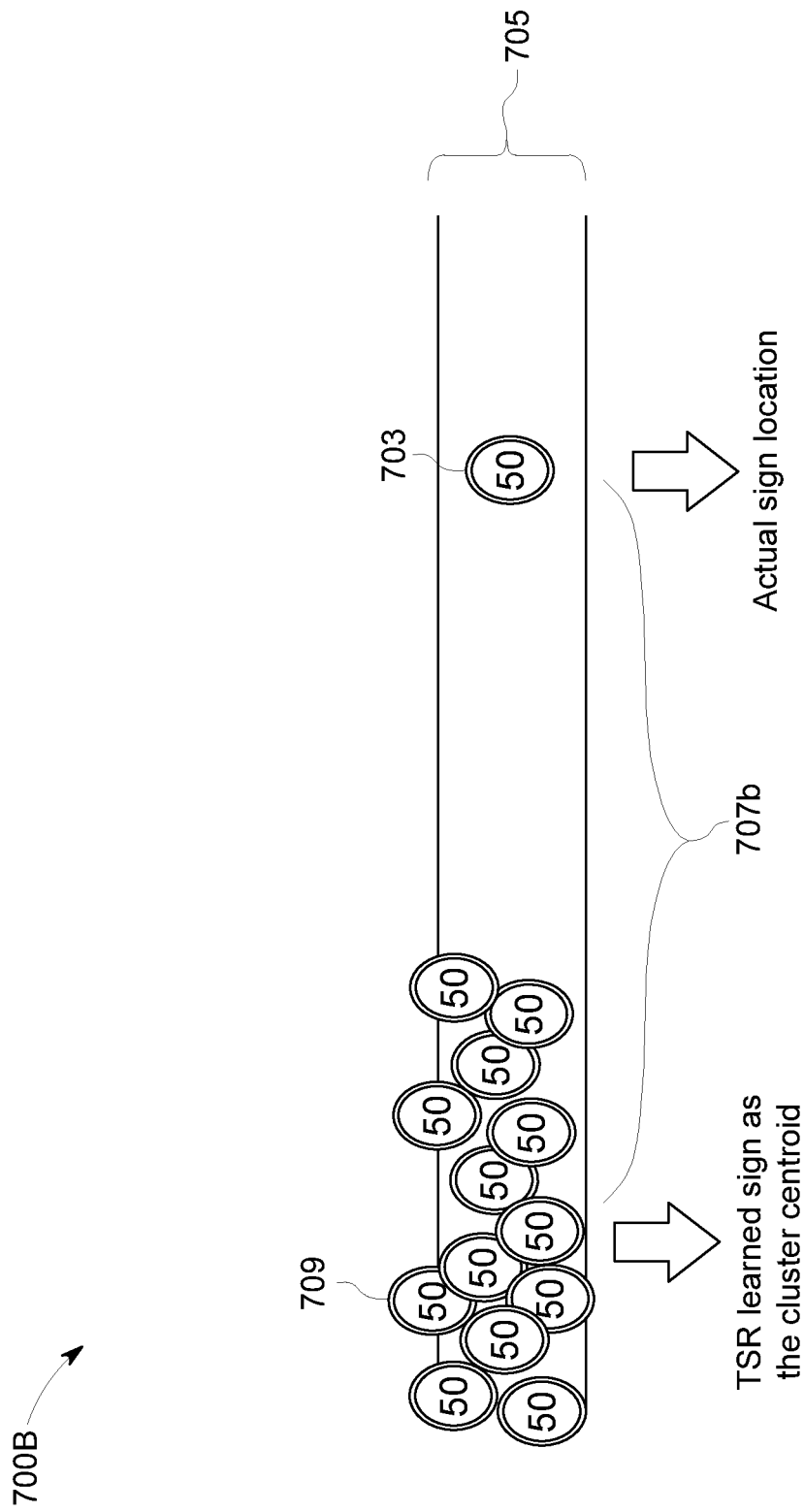

METHODS AND SYSTEMS FOR DETERMINING POSITIONAL OFFSET ASSOCIATED WITH A ROAD SIGN

FIELD OF THE PRESENT DISCLOSURE

An example embodiment of the present invention generally relates to mapping and navigation applications, and more particularly relates to a method, system, and computer programmable product for determining positional offsets associated with a road sign.

BACKGROUND

Various navigation applications are available to provide directions for driving, walking, or other modes of travel. Web sites and mobile applications offer map applications that allow a user to request directions from one point to another. Navigation devices based on Global Positioning System (GPS) technology have become common, and these systems are capable of determining the location of a device to provide directions to drivers, pedestrians, cyclists, and the like. As part of navigation process, it is important for users of vehicles and autonomous and semi-autonomous vehicles to detect road signs, such as, "men at work" sign, "roadwork ahead" sign etc., or temporary signs such as barrier boards, etc. with accurate positioning of these signs.

Moreover, especially for precise navigation assistance particularly in the context of autonomous and semi-autonomous vehicles, identifying such signs well in advance is of utmost importance to avoid collisions and undue mishaps. However, most of the existing sign recognition systems are incapable of computing the offset associated with road sign observations. Sign recognition observations provided by existing sign recognition systems are inaccurate due to presence of a distance gap (offset) between the information of GPS logger and the actual road sign. Quite often there may be errors/offsets in the determined position of a road sign when compared with the actual position of the road sign. As such, the location of road signs determined by these systems may be inaccurate and not suitable for applications requiring precise positioning.

SUMMARY

Accurate detection of road signs is essential for navigation of autonomous vehicles and providing environmental awareness for vehicle safety has been a primary concern for automobile manufacturers and related service providers. In vehicles, such as, autonomous vehicles, a plurality of sensors are installed to capture the road signs observations and road signs are learnt from the road sign observations. However, with current sensors installed in the autonomous vehicles, the autonomous vehicles may not be able to detect road signs accurately. Generally, a number of running vehicles capture the road sign observations, therefore, there may be a huge offset between the information collected by the plurality of sensors installed in the running vehicles and actual road sign. Accordingly, there is a need for a more efficient system for determining offset related to location of road signs.

A method, apparatus, and computer program product are provided in accordance with an example embodiment described herein for determining a positional offset associated with a location of a road sign.

In one aspect, a method for determining a positional offset associated with a location of a road sign is disclosed. The method includes obtaining a first plurality of road sign observations of the road sign captured by a plurality of vehicles, wherein the first plurality of road sign observations comprise location data of the plurality of vehicles, heading data of the plurality of vehicles, and speed data of the plurality of vehicles; computing, by a processor, a plurality of longitudinal offsets between at least a second plurality of road sign observations of the first plurality of road sign observations and ground truth data associated with the road sign; deriving, by the processor, a function, based on the plurality of longitudinal offsets and the speed data in the at least second plurality of road sign observations; and determining, by the processor, the positional offset associated with the location of the road sign, based on a learned heading and the derived function, wherein the learned heading is based on the heading data of the plurality of vehicles.

In another aspect, a system for determining a positional offset associated with a location of a road sign is disclosed. The system comprises at least one non-transitory memory configured to store computer program code instructions; and at least one processor configured to execute the computer program code instructions to: obtain a first plurality of road sign observations of the road sign captured by a plurality of vehicles, wherein the first plurality of road sign observations comprise location data of the plurality of vehicles, heading data of the plurality of vehicles, and speed data of the plurality of vehicles; compute a plurality of longitudinal offsets between at least a second plurality of road sign observations of the first plurality of road sign observations and ground truth data associated with the road sign; derive a function, based on the plurality of longitudinal offsets and the speed data in the at least second plurality of road sign observations; and determine the positional offset associated with the location of the road sign, based on a learned heading and the derived function, wherein the learned heading is based on the heading data of the plurality of vehicles.

In yet another aspect, a computer program product comprising at least one non-transitory computer-readable storage medium for determining a positional offset associated with a location of a road sign is disclosed. The computer-readable storage medium having stored thereon computer-executable program code instructions which when executed by a computer, cause the computer to carry out operations for determining a positional offset associated with a location of a road sign. The operations comprise obtaining a first plurality of road sign observations of the road sign captured by a plurality of vehicles, wherein the first plurality of road sign observations comprise location data of the plurality of vehicles, heading data of the plurality of vehicles, and speed data of the plurality of vehicles; computing a plurality of longitudinal offsets between at least a second plurality of road sign observations of the first plurality of road sign observations and ground truth data associated with the road sign; deriving a function, based on the plurality of longitudinal offsets and the speed data in the at least second plurality of road sign observations; and determining the positional offset associated with the location of the road sign, based on a learned heading and the derived function, wherein the learned heading is based on the heading data of the plurality of vehicles.

According to some embodiments, the at least second plurality of road sign observations may be extracted, by the at least one processor, from the first plurality of road sign observations, based on the ground truth data associated with the road sign, wherein the ground truth data indicates an actual location of the road sign, an actual heading of the road sign, an actual road sign type of the road sign, and an actual road sign value.

According to some embodiments, extracting the at least second plurality of road sign observations may comprise searching for one or more candidate road sign observations in the first plurality of road sign observations, with corresponding location data lying within a radius of a threshold distance from the actual location of the road sign; determining one or more primary road sign observations from the one or more candidate road sign observations, having a heading difference with the actual heading of the road sign within a threshold range; and extracting the at least second plurality of road sign observations from the one or more primary road sign observations based on the actual road sign value and the actual road sign type to obtain.

According to some embodiments, the location of the road sign may be updated on a map-matched link, based on a learned location of the road sign and the determined position offset, wherein the learned location of the road sign is based on the location data of the plurality of vehicles in the first plurality of road sign observations.

According to some embodiments, the learned location of the road sign may comprise a longitudinal component and a latitudinal component.

According to some embodiments, the first plurality of road sign observations may comprise time stamps associated with the first plurality of road sign observations, road sign types of the road sign captured by the plurality of vehicles, and road sign values of the road sign captured by the plurality of vehicles.

According to some embodiments, the speed data in the at least second plurality of road sign observations may be one of data associated with average speeds of the plurality of vehicles at the road sign, an 85th percentile speed at the road sign, or a speed limit at the road sign.

According to some embodiments, the road sign may be one of a speed limit sign, a yellow lane marking, an underpass sign, an overpass sign, a road marking, or a lane marking.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
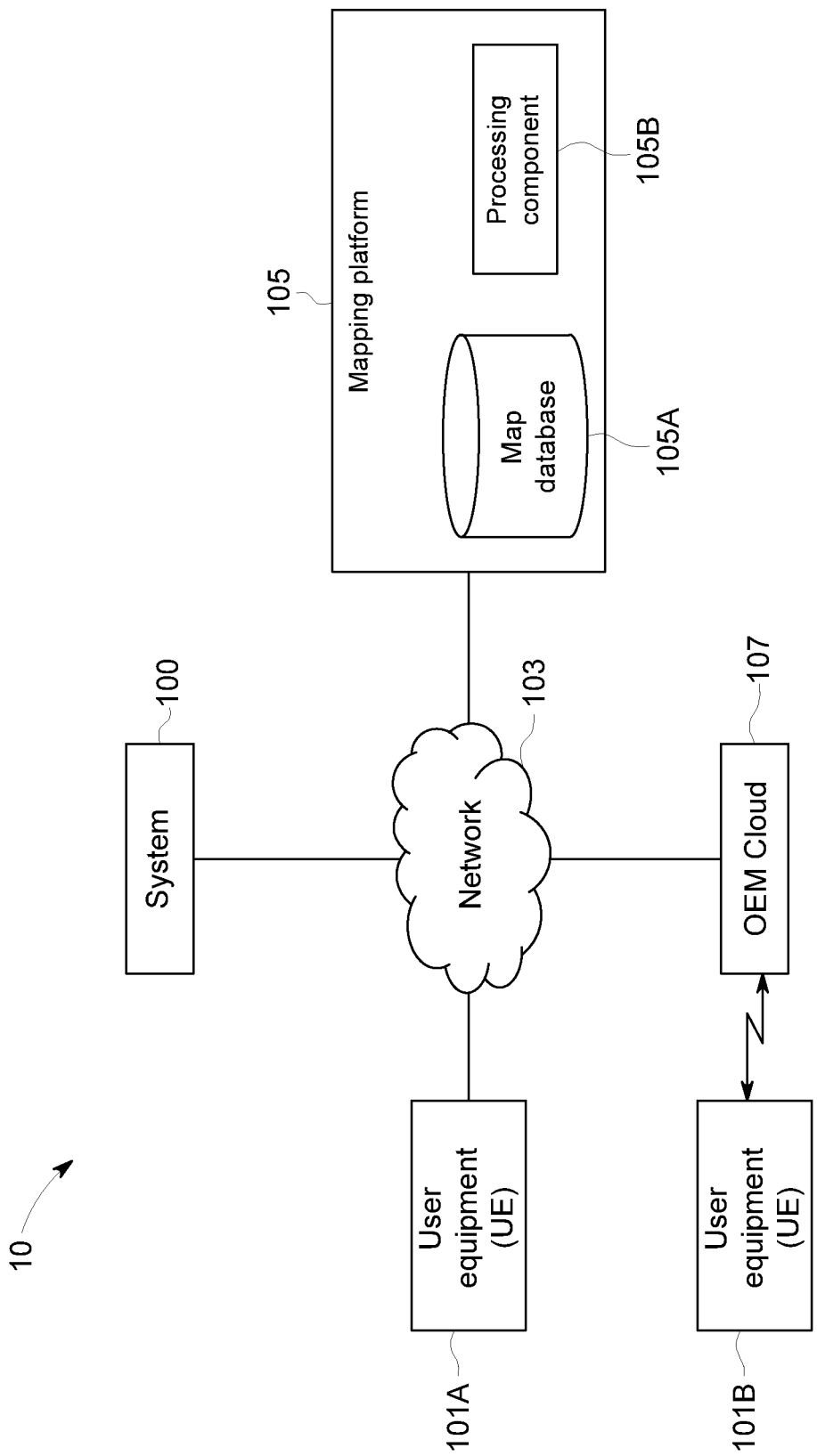
Figure 2:
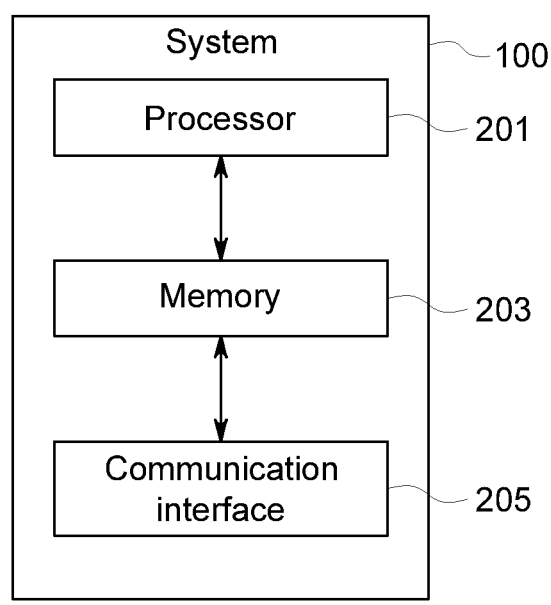
Figure 3:
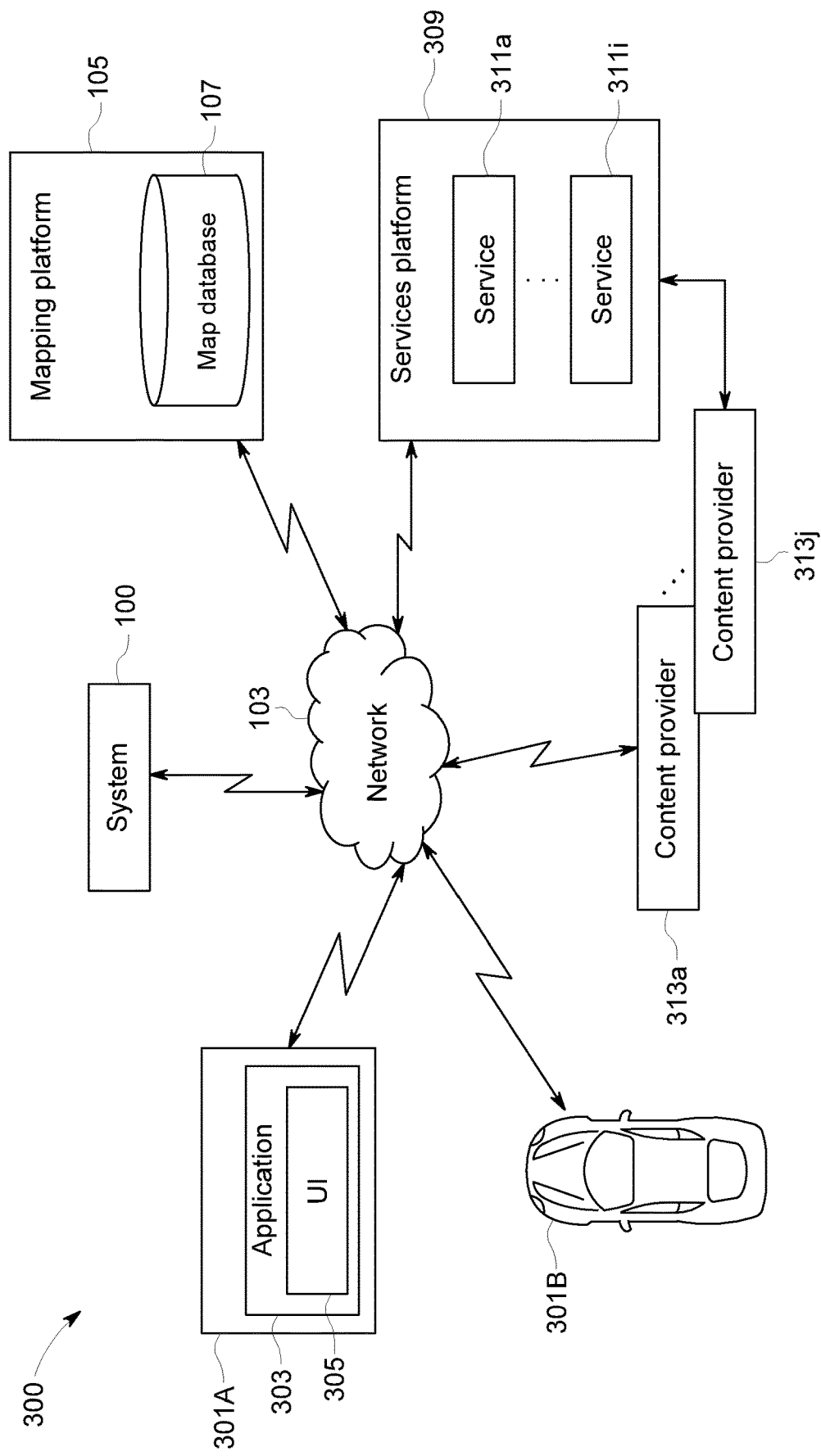
Figure 4:
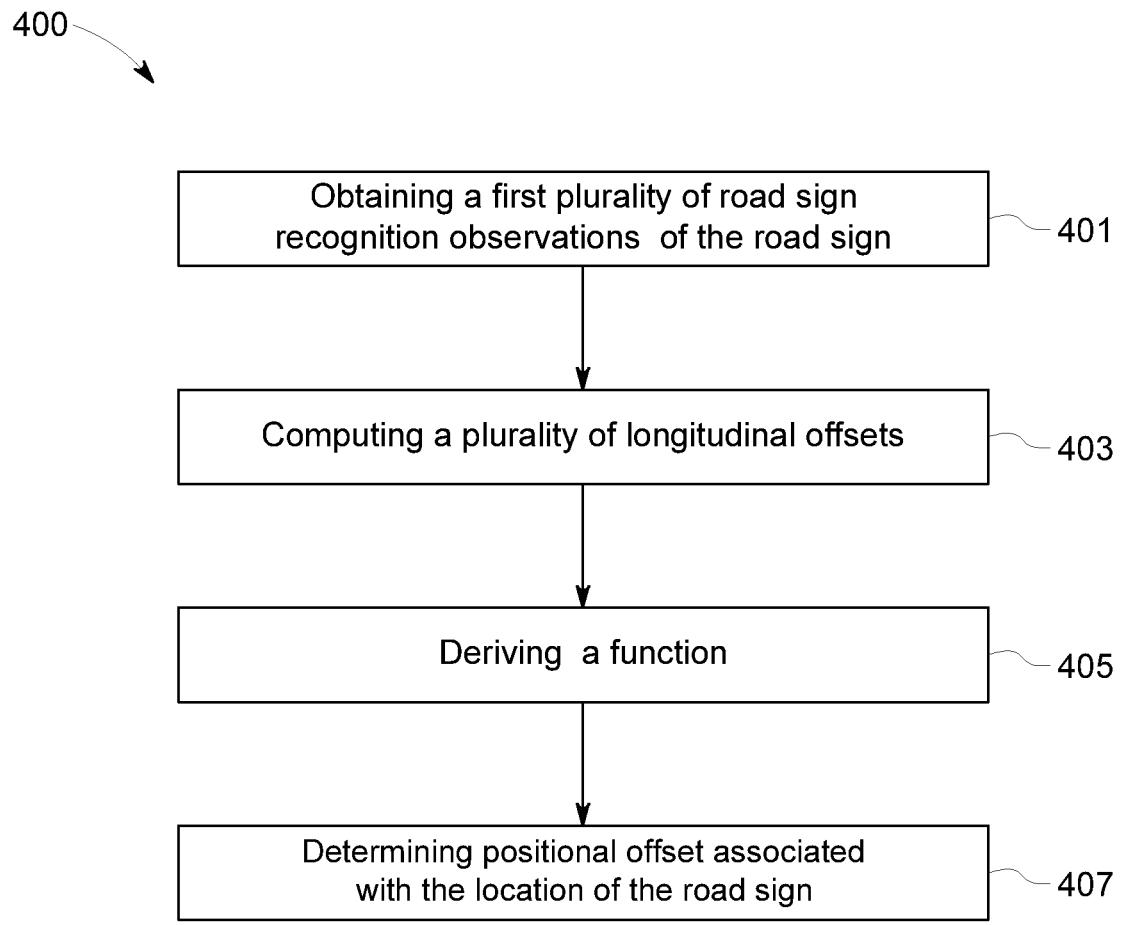
Figure 5A:
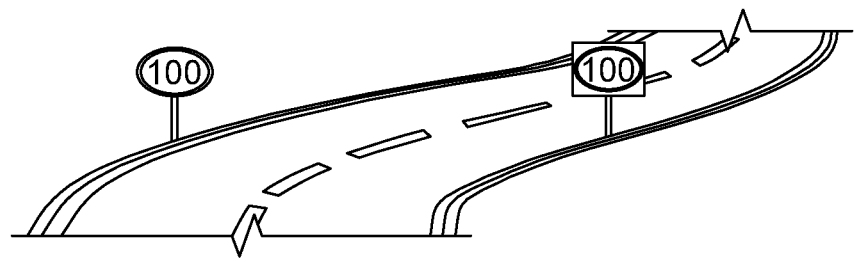
Figure 5B:
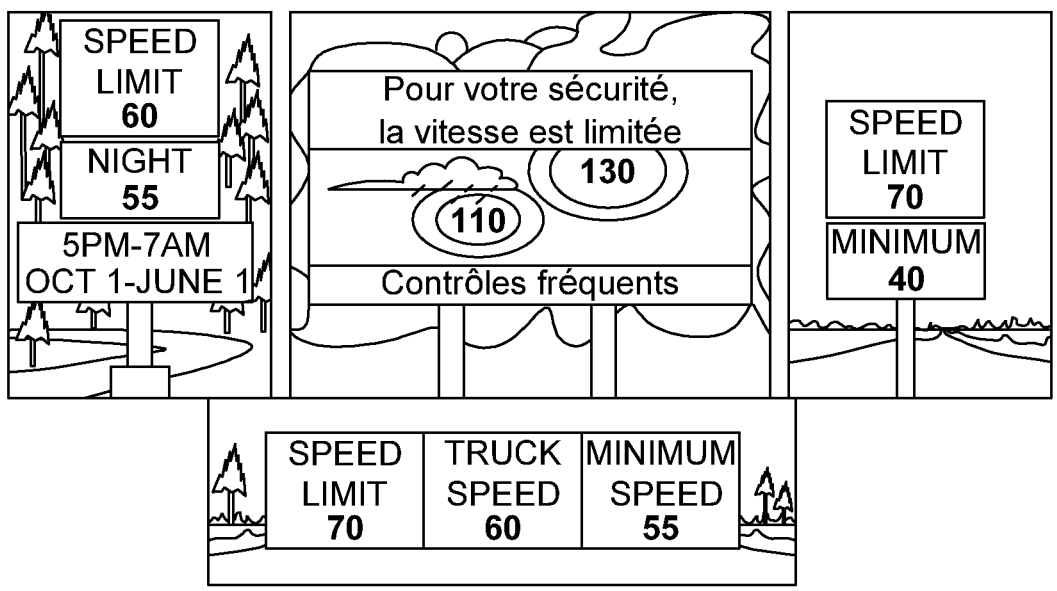
Figure 6:
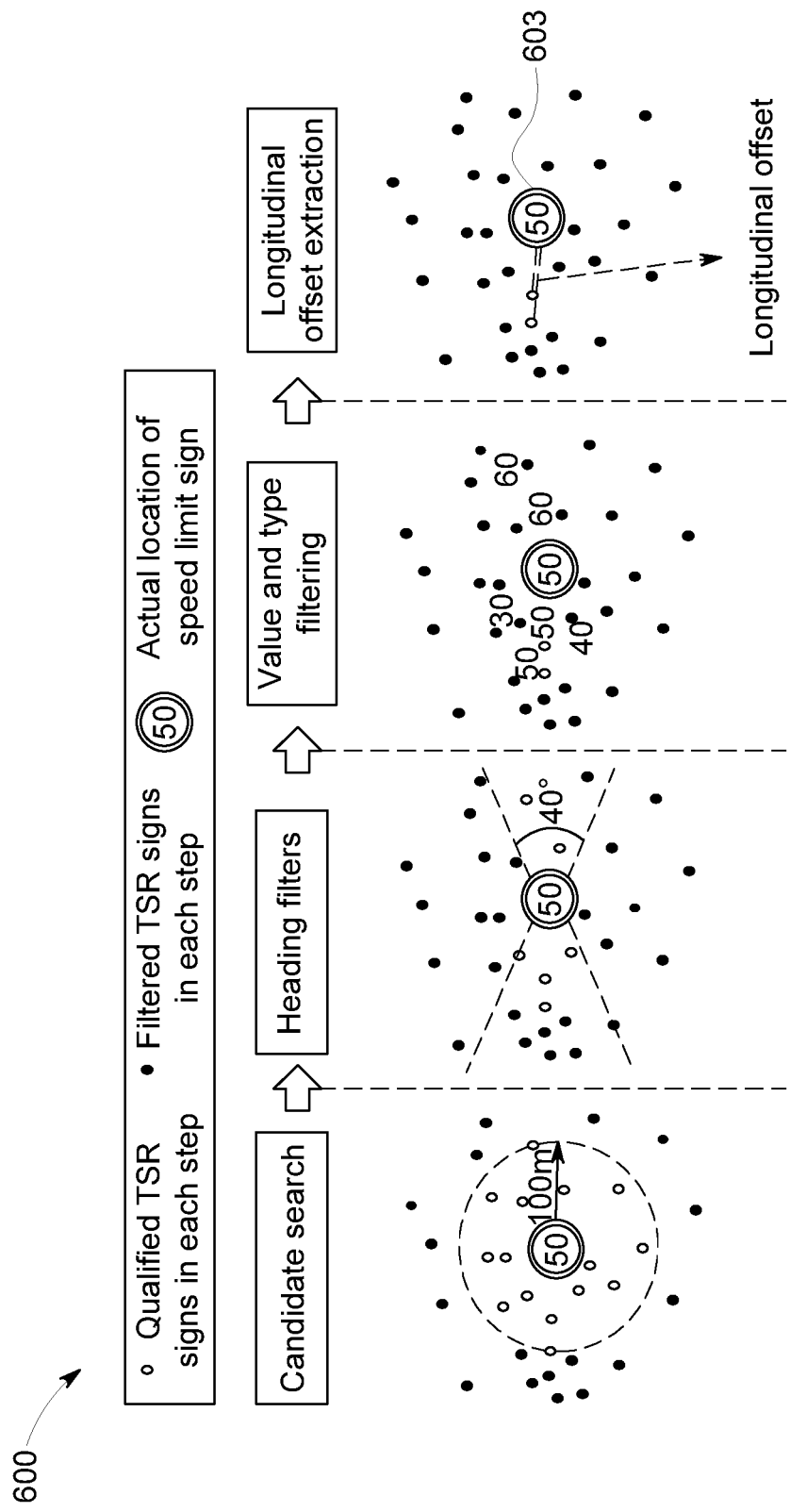
Figure 7A:
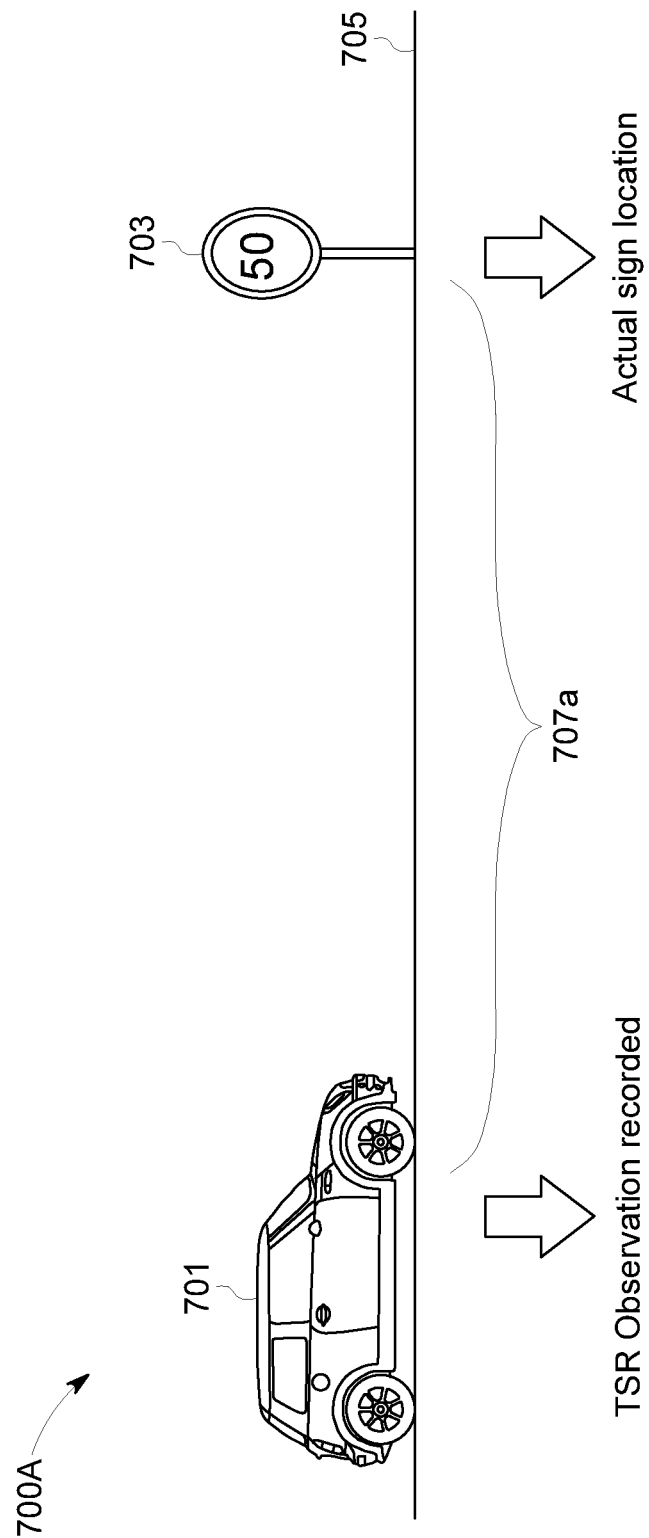
Figure 8:
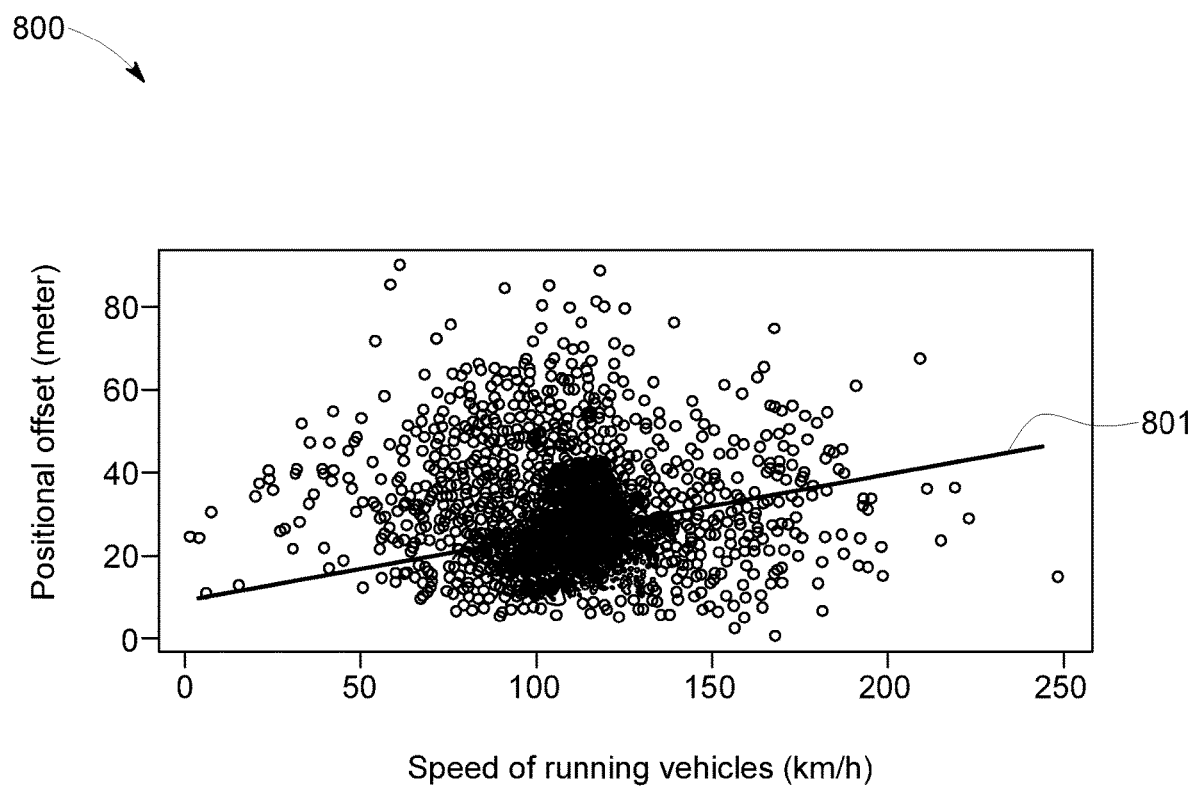

Having thus described example embodiments of the invention in general terms, reference will now be made to the accompanying drawings, which are not necessarily drawn to scale, and wherein:

FIG. 1 illustrates a schematic diagram of an exemplary scenario in which a system for determining a positional offset associated with a location of a road sign is implemented, in accordance with one or more example embodiments;

FIG. 2 illustrates a block diagram of the system for determining the positional offset associated with the location of the road sign, in accordance with one or more example embodiments;

FIG. 3 illustrates a block diagram of the working environment of the system exemplarily illustrated in FIG. 2, in accordance with one or more example embodiments;

FIG. 4 illustrates a flowchart depicting steps in a method for determining a positional offset associated with a location of a road sign, in accordance with one or more example embodiments;

FIGS. 5A-5B illustrate schematic diagrams showing positioning of road signs, in accordance with one or more example embodiments;

FIG. 6 illustrates a schematic diagram comprising steps for extracting longitudinal offsets of a plurality of road sign observations, in accordance with one or more example embodiments;

FIGS. 7A-7B illustrate schematic diagrams showing longitudinal offset of a road sign observation and positional offset of a learned road sign, in accordance with one or more example embodiments; and FIG. 8 illustrates a graphical relationship between positional offset of learned road signs and speed of running vehicles, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "user equipment" may be used to refer to any user accessible device such as a mobile phone, a smartphone, a portable computer, and the like that is portable in itself or as a part of another portable object.

The term "road sign" may be used to refer to signs positioned at the side of or above roads to provide information to road users. The road signs may include speed limit sign, street name sign, school sign, 'men at work' sign, a yellow lane marking, an underpass sign, an overpass sign, a road marking, or a lane marking etc.

The term "positional offset" may be used to refer to distance gap between a learned road sign and true road sign corresponding to the learned road sign.

The term "longitudinal offset" may be used to refer to distance gap between each of road sign observation and corresponding true road signs.

The term "ground truth data" may be used to refer to manually recorded actual locations and headings of road signs.

The term "link" may be used to refer to any connecting pathway including but not limited to a roadway, a highway, a freeway, an expressway, a lane, a street path, a road, an alley, a controlled access roadway, a free access roadway and the like.

The term "route" may be used to refer to a path from a source location to a destination location on any link.

End of Definitions

It is well known that road sign observations are captured by running vehicles and road signs are learnt from the road sign observations. The locations of the road sign observations are recorded as those of the vehicles when they recognize and track the signs. In the TSR systems, raw vehicle observations are used without an attempt to reduce the longitudinal error. Thus, signs are learned with this huge distance gap, as a result, there may be inherent problems related to the distance gaps between the road sign observations and true road signs. The method, system, and computer program product are provided herein focus on determining and diminishing the longitudinal error of road sign observations, and thus greatly improve the location accuracy of learned road signs.

A method, system, and computer program product are provided herein in accordance with an example embodiment for determining a positional offset associated with a location of a road sign. In some example embodiments, the method, system, and computer program product provided herein may also be used for navigating a user to a destination location. The method, system, and computer program product disclosed herein provide for improved navigation experience, by improving location accuracy of learned road signs.

A method, system, and computer program product provided herein in accordance with an example embodiment may be used for determining a positional offset associated with a location of a road sign learned from a plurality of road sign observations determined by imaging sensors such as camera, lidar, radar and the like. The method, system, and computer program product disclosed herein provide for utilization of available resources to determine longitudinal offsets of the plurality of road sign observations. Further, the method, system, and computer program product disclosed herein provide means for reducing the positional offset associated with the location of the learned road sign and thereby increasing efficiency of navigational systems.

FIG. 1 illustrates a schematic diagram of an exemplary navigation scenario 10 in which a system 100 for determining a positional offset associated with a location of a road sign is implemented, in accordance with one or more example embodiments. The road signs may include speed limit sign, street name sign, school sign, 'men at work' sign, a yellow lane marking, an underpass sign, an overpass sign, a road marking, or a lane marking and the like. The road signs may be static road signs or variable road signs positioned along the road. Sign values of variable road signs may vary based on traffic conditions in the vicinity of the variable road signs, such as, LCD display panels, LED panels, etc. The system 100 may be communicatively coupled to one or more user equipment 101A via a network 103. The system 100 may further be in communication with a mapping platform 105, via the network 103. One or more user equipment 101B may be communicatively connected to an OEM cloud 107 which in turn may be accessible to the system 100 via the network 103.

The one or more user equipment (101A, 101B) may capture a first plurality of road sign observations of road signs along a road. Additionally or optionally, the user equipment 101 may comprise a navigation application, that may be configured to provide route guidance and navigation related functions. The one or more user equipment (101A, 101B) may comprise sensors to capture the first plurality of road sign observations, such as a camera for capturing images of road signs along the road, one or more position sensors to obtain location data of locations at which the images are captured, one or more orientation sensors to obtain heading data of the one or more user equipment (101A, 101B) at the locations at which the images are captured, one or more motion sensors to obtain speed data of the one or more user equipment (101A, 101B) at the locations at which the images are captured. In some example embodiments, the one or more user equipment (101A, 101B) may comprise LIDAR sensors for capturing the first plurality of road sign observations.

In some example embodiments, the one or more user equipment (101A, 101B) may be vehicles (autonomous, semi-autonomous, or manually driven) itself, or a part thereof. In some example embodiments, the one or more user equipment (101A, 101B) may correspond to devices installed in a vehicle such as an infotainment system, a control system of the electronics, or a mobile phone connected with the control electronics of the vehicle. In some example embodiments, the system 100 may directly obtain the first plurality of road sign observations from the user equipment 101A. In some example embodiments, the first plurality of road sign observations may be accessible to the system 100 from the OEM cloud 107. For this purpose, the user equipment 101B may upload the captured road signs to the OEM cloud sequentially or in batches which may then be bundled by the OEM cloud for access by the system 100.

In some example embodiments, the one or more user equipment (101A, 101B) may include a mobile computing device such as a laptop computer, tablet computer, mobile phone, smart phone, navigation unit, personal data assistant, watch, camera, or the like. Additionally or alternatively, the one or more user equipment (101A, 101B) may comprise a fixed computing device, such as a personal computer. The user equipment 101 may be configured to access the mapping database 105A of the mapping platform 105 via a processing component 105B through, for example, a user interface of a mapping application, such that the user equipment 101 may provide navigational assistance to the user among other services provided through access to the mapping platform 105.

The network 103 may be wired, wireless, or any combination of wired and wireless communication networks, such as cellular, Wi-Fi, internet, local area networks, or the like. In one embodiment, the network 103 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

As exemplarily illustrated, the mapping platform 105 may also include a map database 105A, which may store node data, road segment data or link data, point of interest (POI) data, posted signs related data or the like. The map database 105A may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road/link data and the node data may represent a road network, such as used by vehicles, for example, cars, trucks, buses, motorcycles, and/or other entities. Optionally, the map database 105A may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 105A may include data about the POIs and their respective locations in the POI records. The map database 105A may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In one or more embodiments, the map database 105A may include ground truth data of road signs. In addition, the map database 105A may include event data (e.g., traffic incidents, construction activities, scheduled events, unscheduled events, etc.) associated with the POI data records or other records of the map database 105A associated with the mapping platform 105. The map database 105A may additionally include data related to road signs, such as, location of the road signs, diversions to be caused as indicated in the road signs, suggested routes to avoid congestion to be caused as indicated in the road signs, etc. The data related to road signs may be fetched from external systems, such as, roadwork planning system of the municipalities.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 105A of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 105A may be a master geographic database configured at a server side, but in alternate embodiments, a client side map database 105A may represent a compiled navigation database that may be used in or with end user devices (e.g., one or more user equipment 101A, 101B) to provide navigation, speed adjustment and/or map-related functions to navigate through roadwork zones. The map database 105A may be used with the end user device the user equipment 101A to provide the user with navigation features. In such a case, the map database 105A may be downloaded or stored on the user equipment 101 which may access the mapping platform 105 through a wireless or wired connection, over the network 103.

FIG. 2 illustrates a block diagram of the system 100 for determining the positional offset associated with a location of the road sign, in accordance with one or more example embodiments of the present invention. The system 100 may include a processing means such as at least one processor 201, a storage means such as at least one memory 203, and a communication means such as at least one communication interface 205. The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with a memory 203 via a bus for passing information among components of the system 100. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 303). The memory 203 may be configured to store information, data, content, applications, instructions, or the like, for enabling the apparatus to carry out various functions in accordance with an example embodiment of the present invention. For example, the memory 203 could be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to users of the system 100 disclosed herein. The IoT related capabilities may in turn be used to provide smart city solutions by providing real time parking updates, big data analysis, and sensor-based data collection by using the cloud based mapping system 100 for providing navigation and parking recommendation services and roadwork zone identification services. In some embodiments, the system 100 may be configured to provide an environment for development of parking strategy recommendation solutions for navigation systems in accordance with the embodiments disclosed herein. The environment may be accessed using the communication interface 205. The communication interface 205 may provide an interface for accessing various features and data stored in the system 100.

FIG. 3 describes a block diagram of the working environment 300 of the system exemplarily illustrated in FIG. 2. The system 100 may be communicatively coupled to one or more user equipment 301A, 301B. In the exemplary scenario depicted in FIG. 3, the user equipment 301A may be a considered to be a smartphone that runs an application 303 such as a navigation application on a user interface (UI) 305. The user equipment 301B may be considered to be a vehicle such as an autonomous, semi-autonomous, or a manually driven vehicle. An autonomous vehicle, as used throughout this disclosure, may refer to a vehicle having autonomous driving capabilities at least in some conditions. Although two user equipment are described herein, it may be contemplated that fewer or a greater number of user equipment may be present. In one embodiment, the system 100 may communicate with the one or more user equipment 301A, 301B (through for example the communication interface 205), to obtain the sensor data and the first plurality of road sign observations. In an embodiment, the system 100 may obtain via the communication interface 205 some or all of the first plurality of road sign observations from the OEM cloud 107 over the network 103. In some example embodiments, the processor 201 may obtain ground truth data from the mapping platform 105 via the communication interface 205.

The road sign observations may refer to sensor data collected from vehicles as sensors (for example vehicle 301B). The ground truth data may be historic data indicating actual locations, actual headings, actual road sign type of the road signs, and actual road sign value of road signs. The sensor data may be generated on detection of static road signs positioned along the pathways. In an embodiment, the road sign observations may refer to sensor data from digital or dynamic signs, such as, LED panels, LCD panels, etc., positioned along the pathways. In some example embodiments, the system 100 may also receive through the communication interface 205, destination information of a user of the user equipment 301A via the network 103. The road sign observations may further comprise time of capture of the road sign observations as a time stamp associated with each of the road sign observations. A plurality of vehicles, such as, 301B passing by the location of each of the road signs on the pathway, may generate a plurality of road sign observations for each of the road signs. Thus, each road sign observation may be different from other road sign observation based on location data, heading data, road sign value, and road sign type, and time of capture of the road sign from a vehicle. The road sign observations may further comprise location data of the vehicle at the time of capture of each of the road signs. Such location data may be acquired by suitable location sensors installed in the vehicle 301B. The location of the road sign may thus correspond to the location of capture of the road sign from the vehicle 301B. In some example embodiments, the road sign observations may further comprise motion data such as speed data of the vehicles such as the vehicle 301B at the instance of capture of each of the road sign observations. Such motion data may be captured by one or more motion sensors (for example accelerometer) of the vehicle 301B. The vehicle 301B may thus include one or more sensors such as a camera, an acceleration sensor, a gyroscopic sensor, a LIDAR sensor, a proximity sensor, a motion sensor, a speed sensor and the like. The sensors may primarily be used for detecting road signs, determining speed and position of the vehicle 301B. In one or more embodiments, the sensors may be built-in or embedded into or within interior of the vehicle 301B. In some embodiments, the vehicle 301B may use communication signals for position determination. The vehicle 301B may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors may be used to gather information related to a road sign, for example, a speed limit sign. In some embodiments, the vehicle 301B may have sensors positioned on or within itself and the sensors may provide data indicating a location and speed of the vehicle 301B, heading data associated with the vehicle 301B, sign types of the road signs, and sign values of the road signs along pathways. The data collected by the sensors may be transmitted to the OEM cloud.

The system 100 may then cluster the road sign observations to generate learned road signs and map match the learned road signs to links of the road. From the learned road signs, the system 100 may generate primary speed funnels. In one embodiment, the user device or the user equipment 301A may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user of the user equipment 301A may request for navigation and map functions such as guidance and map display, for example, and for determination of one or more personalized routes or route segments based on one or more calculated and recorded routes, according to some example embodiments. In some embodiments, the user equipment 301A may be notified by the system 100 about precise location of roadwork zones based on adjustment of the positional offset in the determined location of the road sign. For this, the system first determines the positional offset associated with the location of the road sign. The determination of the positional offset is next discussed in detail in the subsequent disclosures.

The vehicle 301B may be a user driven vehicle or an autonomous vehicle. An autonomous vehicle, as used throughout this disclosure, may refer to a vehicle having autonomous driving capabilities at least in some conditions. For example, the autonomous vehicle may exhibit autonomous driving on streets and roads having physical dividers between driving lanes.

Probe data collected by the vehicle 301B may be representative of the location of the vehicle 301B at a respective point in time and may be collected while the vehicle 301B is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The vehicle 301B may comprise any device capable of collecting the aforementioned probe data. In one example, using the sensor data from the vehicle 301B, the system 100 may generate at least one route speed funnel for roadwork zone identification to assist the user equipment 301A to navigate through the roadwork zone. The sensor data generated by the sensors of the vehicle 301B may constitute road sign observations and speed data of the vehicle 301B. That is, the sensors installed in the vehicle 301B may capture road signs along the pathway and capture the location of the road sign, type of the road sign, value of the road sign, heading at the location of the road sign, time stamp associated with the time of capture of the road sign and speed of the vehicle 301B. The captured location of the road sign, type of the road sign, value of the road sign, heading at the location of the road sign, and time stamp associated with the capture of the road sign constitute the road sign observations. The processing of the road sign observations to generate learned road signs and processing of the learned road signs to determine positional offsets of the learned road signs is performed by the processor 201, exemplarily illustrated in FIG. 2.

The working environment 300 may further include a services platform 309, which may be used to provide navigation related functions and services 311a-311i to the application 303 running on the user equipment 301A. The services 311a-311i may include such as navigation functions, speed adjustment functions, traffic related updates, weather related updates, warnings and alerts, parking related services, indoor mapping services and the like. The services 311a-311i may be provided by a plurality of content providers 313a-313j. In some examples, the content providers 313a-313j may access various SDKs from the services platform 309 for implementing one or more services. In an example, the services platform 309 and the mapping platform 105 may be integrated into a single platform to provide a suite of mapping and navigation related applications for OEM devices, such as the user equipment 301A. The user equipment 301A may be configured to interface with the services platform 309, the content provider's services 313a-313j, and the mapping platform 105 over the network 103. Thus, the mapping platform 105 and the services platform 309 may enable provision of cloud-based services for the user equipment 301A, such as, storing the road sign observations in an OEM cloud in batches or in real-time and retrieving the stored road sign observations for determining positional offset associated with a location of a learned road sign.

The heading associated with a road sign may be the heading of the vehicle 301B capturing the road sign and the heading of the road sign may be the heading data in a road sign observation. In one or more example embodiments, the ground truth data collection may be achieved by randomly collecting road sign information within a designated geographic area using a location tracking device such as a GPS logger to record the corresponding time, locations and headings once a road sign is observed. Thus, the road sign information is initially verified manually.

The system 100 may fetch ground truth data from the map database 107, which may be similar to the map database 105A. The system 100 may extract a second plurality of road sign observations from the first plurality of road sign observations based on the ground truth data. The ground truth data may indicate an actual location of the road sign, an actual heading of the road sign, an actual road sign type of the road sign, and an actual road sign value. In order to extract the second plurality of road sign observations, the system 100 may search for one or more candidate road sign observations in the first plurality of road sign observations, with corresponding location data lying within a radius of a threshold distance from the actual location of the road sign. The threshold value may be any value set according to requirement, for example based on processing capability and computation time of the system 100. The system 100 may next determine one or more primary road sign observations from the one or more candidate road sign observations, having a heading difference with the actual heading of the road sign within a threshold range. The system 100 may extract the second plurality of road sign observations from the one or more primary road sign observations based on the actual road sign value and the actual road sign type. The output of the extracting step may thus be considered as the second plurality of road sign observations. Since the second plurality of road sign observations is captured by one or more vehicles such as the vehicle 31B, the speed data in the second plurality of road sign observations is one of data associated with average speed of the plurality of vehicles at the road sign, an 85th percentile speed at the road sign, or a speed limit at the road sign. The system 100 may compute a plurality of longitudinal offsets between the second plurality of road sign observations and ground truth data associated with the second plurality of road sign observations.

Next, the system 100 may derive a regression function and calculate a distance used to minimize the plurality of longitudinal offsets.

The system 100 may thus determine positional offset of the road sign based on two factors viz. learned heading and learned location of a road sign, and the derived regression function. The learned heading and learned location may be based on the heading data and location data of a plurality of vehicles, such as the vehicle 301B. The system 100 may update the location of the road sign on a map-matched link, based on a learned location of the road sign and the determined positional offset. The learned location of the road sign is based on the location data of the plurality of vehicles in the first plurality of road sign observations and comprises a longitudinal component and a latitudinal component. The update of the location of the road sign may thus be communicated to for example the mapping platform 105 which may generate an updated map reflecting the updated location of the road sign. In some example embodiments, the system 100 may cause or may itself generate the updated map based on the map data and the computed positional offset.

On determination of positional offset, the user interface module 305 may provide navigation assistance to the vehicle 301B or to user of the vehicle 301B. The different representations of the navigation assistance may be in the form of a map with color coded or patterned road links indicating traffic conditions on the route, locations of route speed funnels on the route, etc. In an embodiment, the user interface module 305 may receive destination information from the user on the user interface 205 of the user equipment 301B. In some example embodiments, the user interface module 305 may notify the users of the vehicles 201 via the user interface 205 of the user equipment 301B about roadwork zone ahead based on the generated route speed funnel. In some example embodiments, the user interface module 305 renders the notification about changes in navigation routes due to the roadwork zone ahead and impact of the modified roadwork zones on parking situations, in mobile applications or navigation applications used by the users. The user interface module 305 may be configured to update the rendered recommendations.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to generate at least one route speed funnel according to the embodiments disclosed herein.

As noted above, the system 100 and/or the mapping platform 105 may be embodied by a processing component. However, in some embodiments, the system 100 and/or the mapping platform 105 may be embodied as a chip or chip set. In other words, the system 100 and/or the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The system 100 may therefore, in some cases, be configured to implement an example embodiment of the present invention on a single "system on a chip." As such, in some cases, a chip or chipset may constitute a means for performing one or more operations for providing the functionalities described herein.

The user interface 305 of the user equipment 301A may in turn be in communication with the system 100 to provide output to the user and, in some embodiments, to receive an indication of a user input. In some example embodiments, the user interface 305 may communicates with the system 100 and displays input and/or output of the system 100. As such, the user interface 305 may include a display and, in some embodiments, may also include a keyboard, a mouse, a joystick, a touch screen, touch areas, soft keys, one or more microphones, a plurality of speakers, or other input/output mechanisms. In one embodiment, the system 100 may comprise user interface circuitry configured to control at least some functions of one or more user interface elements such as a display and, in some embodiments, a plurality of speakers, a ringer, one or more microphones and/or the like. The processor 201 and/or user interface circuitry comprising the processor 201 may be configured to control one or more functions of one or more user interface elements through computer program instructions (for example, software and/or firmware) stored on a memory accessible to the processor 201. In some example embodiments, the processor 201 may be configured to provide a method for determining a positional offset associated with a location of a road sign as will be discussed in conjunction with FIG. 4 as below.

FIG. 4 exemplarily illustrates a method 400 for determining a positional offset associated with a location of a road sign, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 100, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for determining a positional offset associated with a location of a road sign may include, at step 401, obtaining a first plurality of road sign observations of the road sign captured by a plurality of vehicles. The first plurality of road sign observations may comprise location data of the plurality of vehicles, heading data of the plurality of vehicles, and speed data of the plurality of vehicles. The method 400, at step 403, may include computing a plurality of longitudinal offsets between at least a second plurality of road sign observations of the first plurality of road sign observations and ground truth data associated with the road sign. At step 405, the method 400 may include deriving a function based on the plurality of longitudinal offsets and the speed data in the at least second plurality of road sign observations. Further, the method 400 may comprise, at step 407, determining the positional offset associated with the location of the road sign, based on a learned heading, a learned location and the derived function. The learned heading and the learned location may be based on the location data, the heading data of the plurality of vehicles.

Additionally, the method 400 may include various other steps not shown in FIG. 4 may also be included in the method 400. For example, the method 400 may further comprise extracting the a least second plurality of road sign observations from the first plurality of road sign observations based on the ground truth data associated with the road sign. The ground truth data may indicate an actual location of the road sign, an actual heading of the road sign, an actual road sign type of the road sign, and an actual road sign value. As part of extraction of the second plurality of road sign observations, the method 400 may comprise searching for one or more candidate road sign observations in the first plurality of road sign observations, with corresponding location data lying within a radius of a threshold distance from the actual location of the road sign. The extraction of the second plurality of road sign observations may further comprise determining one or more primary road sign observations from the one or more candidate road sign observations, having a heading difference with the actual heading of the road sign within a threshold range. Further, the extraction of the second plurality of road sign observations may comprise extracting the at least second plurality of road sign observations from the one or more primary road sign observations based on the actual road sign value and the actual road sign type. The method 400 may further comprise updating the location of the road sign on a map-matched link, based on a learned location of the road sign and the determined position offset, wherein the learned location of the road sign is based on the location data of the plurality of vehicles in the first plurality of road sign observations.

In an example embodiment, a system for performing the method of FIG. 4 above may comprise a processor (e.g. the processor 303) configured to perform some or each of the operations (401-407) described above. The processor may, for example, be configured to perform the operations (401-407) by performing hardware implemented logical functions, executing stored instructions, or executing algorithms for performing each of the operations. Alternatively, the system may comprise means for performing each of the operations described above. In this regard, according to an example embodiment, examples of means for performing operations 401-407 may comprise, for example, the processor 201 and/or a device or circuit for executing instructions or executing an algorithm for processing information as described above.

On implementing the method 400 disclosed herein, the end result generated by the system 100 is a tangible determination of a positional offset associated with a location of a road sign. The system 100 may be capable of determining positional offset of road signs positioned on highways, local roads, etc. The outcome of implementation of method 400 in navigational systems is shown in FIG. 9.

FIG. 5A and FIG. 5B illustrate schematic diagrams showing positioning of road signs, in accordance with an example embodiment. As exemplarily illustrated in FIG. 5A, a speed limit sign with value 100 may be located on both sides of a pathway approaching a roadwork zone. In such scenarios, the sensors of the vehicle 301B may generate road sign observations for both the speed limit signs. From the road sign observations, the system 100 or the vehicle 301B may generate learned road signs corresponding to the speed limit signs. As exemplarily illustrated in FIG. 5B, there may be more than one speed limit value in a speed limit sign on a pathway for different conditions, such, during a normal day and a rainy day, during different times of day, month, or year, etc. The sensors may generate more than one road sign observation for a speed limit sign and the system 100 or the vehicle 301B may generate more than one learned road sign corresponding to the speed limit sign. Two or more learned road signs may be map-matched on a same directional link and the distance between them may be within 15 meters.

FIG. 6 illustrates a schematic diagram comprising steps for extracting longitudinal offsets of a plurality of road sign observations, in accordance with one or more example embodiments. The schematic diagram 600 of FIG. 6 depicts extraction of longitudinal offset of a learned road sign 603. As exemplarily illustrated, the learned road sign 603 may be a target learned road sign that has a sign value of 50 Km/hr, heading of 90 degrees, and is a sign type indicating a speed limit start. In first step, the system 100 may look for candidate learned road signs within a specific radius of the target learned road sign, for example, 100 meters from among the plurality of road sign observations. Next, the system 100 may extract qualified learned road signs from the candidate learned road signs. At this step, system 100 may fetch ground truth data associated with the candidate learned road signs from the map database 107. The system 100 may perform heading filtering on the candidate learned road signs and may filter out the candidate learned road signs other than those road signs whose heading difference with the heading of the learned road sign, as indicated ground truth data, is less than 40 degrees or higher than 320 degrees. Next, the system 100 may further perform filtering on the heading filtered candidate learned road signs based on value and type of the candidate learned road signs. The candidate learned road sign whose value and type are same as that of the ground truth may be selected as qualified learned road sign corresponding to the target learned road sign 603 in third step. Finally, the system 100 may compute the distance between location of the qualified learned road sign and location of the target learned road sign 603 as per ground truth data and may determine the computed distance as the longitudinal offset of the target learned road sign 603.

FIG. 7A and FIG. 7B illustrate schematic diagrams showing longitudinal offset of a road sign observation and positional offset of a learned road sign, respectively, in accordance with one or more example embodiments. The schematic diagram 700A of FIG. 7A depicts an exemplary embodiment where a vehicle 701 may capture location of a road sign 703 with a longitudinal offset on a stretch of a road 705. The term 'longitudinal offset' may be used to mean distance gap of each road sign observation from actual road sign location. When the sensors of the vehicle 701 observes the road sign 703, the sensors may capture location of the road sign 703 as location of the vehicle 701, causing road sign observation of road sign 703 being recorded with longitudinal offset 707*a*. In a similar manner, the schematic diagram 700B of FIG. 7B depicts an exemplary embodiment depicting positional offset 700*b* between an actual road sign 703 on the stretch of road 705 and corresponding learned road sign 709. In one or more example embodiments, the system 100 may determine the learned road sign 709 utilizing one or more clustering techniques. In such a scenario, the centroid of a cluster of road signs formed from two or more road sign observations may be considered as the learned road sign.

FIG. 8 illustrates a graphical diagram depicting relationship between positional offsets of learned road signs and speed of running vehicles, in accordance with one or more example embodiments. In one or more embodiments of the present invention, positional offset 707*b* of a learned road sign 703 may be closely related to running speed of a vehicle 701. In one or more alternative embodiments, positional offset 707*b* may be related the speed limit or even other factors such as road geometry, sight distance and the like. The graphical diagram 800 of FIG. 8 depicts an exemplary embodiment where positional offsets of learned road signs are related to speed of running vehicles. A regression line 801 may show the relationship between positional offsets of learned road signs and speed of running vehicles. The system 100 may calculate a distance used to determine the positional offset of a learned road sign based on a linear regression function. The offset computing module 307 may determine positional offset of a learned road sign using the formula mentioned below.

$$\text{positional offset} = a \times \text{factor} + b; \text{ where}$$

a and b: the parameters in the linear regression function,
factor: average of running speeds of vehicles, 85th percentile speed or the speed limit.

In one or more example embodiments, the system 100 may provide for minimizing the determined positional offset of a learned road sign. In these embodiments, there may be additional modules in the system 100 described in FIG. 2 for performing necessary steps for such a minimization. In one or more alternative example embodiments, the system 100 may carry out steps required for positional offset minimization. In these example embodiments, the system 100 may compute new latitude, new_lat and longitude, new_lon of the learned road sign using the following formulae and may move location of the learned road sign along a calculated distance along its map-matched link.

$$\text{new\_lon} = \text{lon} + (a \times \text{factor} + b) * \sin(\text{heading}),$$

$$\text{new\_lat} = \text{lat} + (a \times \text{factor} + b) * \cos(\text{heading}); \text{ where}$$

new_lon and new_lat: adjusted longitude and latitude of the learned road sign, lon and lat: original longitude and latitude of the learned road sign, heading: heading of the learned road sign.

In one or more example embodiments, values of parameters a and b may be taken as a=−0.022 and b=14.3595.

In this way, example embodiments of the present invention result in an efficient determination of positional offset associated with a location of a road sign comparison to conventional road sign detection techniques. For autonomous and semi-autonomous vehicles, accurate road sign detection is essential to avail better navigation experience. The example embodiments of the present invention may also be implemented for determining positional offsets associated with any other road objects, irrespective of the road objects being permanent or temporary. The road objects may include all types of road furniture (for example, poles, barriers and the like), parts of an infrastructure (for example, tunnels and the like). Thus, the unique methodology described herein, pertaining to accurate determination of positional offset associated with a location of a road sign without use of any extra components, provides for generation of high precision navigation assistance data. In this way, embodiments of the claimed invention add an enhanced capability to present navigational systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for determining a positional offset associated with a location of a road sign, the method comprising:

obtaining a first plurality of road sign observations of the road sign captured by a plurality of vehicles, wherein the first plurality of road sign observations comprise location data of the plurality of vehicles, heading data of the plurality of vehicles, and speed data of the plurality of vehicles;

computing, by a processor, a plurality of longitudinal offsets between at least a second plurality of road sign observations of the first plurality of road sign observations and ground truth data associated with the road sign;

deriving, by the processor, a function, based on the plurality of longitudinal offsets and the speed data in the at least second plurality of road sign observations;

determining, by the processor, the positional offset associated with the location of the road sign, based on a learned heading and the derived function, wherein the learned heading is based on the heading data of the plurality of vehicles; and generating, by the processor, an updated map to be used by the plurality of vehicles by updating the location of the road sign on a map-matched link, based on a learned location of the road sign and the determined positional offset.

2. The method of claim 1, further comprising:

extracting, by the processor, the at least second plurality of road sign observations from the first plurality of road sign observations based on the ground truth data associated with the road sign, wherein the ground truth data indicates an actual location of the road sign, an actual heading of the road sign, an actual road sign type of the road sign, and an actual road sign value.

3. The method of claim 2, wherein extracting the at least second plurality of road sign observations, comprises:

searching for one or more candidate road sign observations in the first plurality of road sign observations, with corresponding location data lying within a radius of a threshold distance from the actual location of the road sign;

determining one or more primary road sign observations from the one or more candidate road sign observations, having a heading difference with the actual heading of the road sign within a threshold range; and extracting the at least second plurality of road sign observations from the one or more primary road sign observations based on the actual road sign value and the actual road sign type.

4. The method of claim 1, wherein the learned location of the road sign is based on the location data of the plurality of vehicles in the first plurality of road sign observations.

5. The method of claim 4, wherein the learned location of the road sign comprises a longitudinal component and a latitudinal component.

6. The method of claim 1, wherein the first plurality of road sign observations further comprises time stamps associated with the first plurality of road sign observations, road sign types of the road sign captured by the plurality of vehicles, and road sign values of the road sign captured by the plurality of vehicles.

7. The method of claim 1, wherein the speed data in the at least second plurality of road sign observations is one of data associated with average speeds of the plurality of vehicles at the road sign, an 85th percentile speed at the road sign, or a speed limit at the road sign.

8. The method of claim 1, wherein the road sign is one of a speed limit sign, a yellow lane marking, an underpass sign, an overpass sign, a road marking, or a lane marking.

9. A system for determining a positional offset associated with a location of a road sign, comprising:

at least one non-transitory memory configured to store computer program code instructions; and at least one processor configured to execute the computer program code instructions to:

obtain a first plurality of road sign observations of the road sign captured by a plurality of vehicles, wherein the first plurality of road sign observations comprise location data of the plurality of vehicles, heading data of the plurality of vehicles, and speed data of the plurality of vehicles;

compute a plurality of longitudinal offsets between at least a second plurality of road sign observations of the first plurality of road sign observations and ground truth data associated with the road sign;

derive a function, based on the plurality of longitudinal offsets and the speed data in the at least second plurality of road sign observations;

determine the positional offset associated with the location of the road sign, based on a learned heading and the derived function, wherein the learned heading is based on the heading data of the plurality of vehicles; and generate an updated map to be used by the plurality of vehicles by updating the location of the road sign on a map-matched link, based on a learned location of the road sign and the determined positional offset.

10. The system of claim 9, wherein the at least one processor is further configured to:

extract the at least second plurality of road sign observations from the first plurality of road sign observations based on the ground truth data associated with the road sign, wherein the ground truth data indicates an actual location of the road sign, an actual heading of the road sign, an actual road sign type of the road sign, and an actual road sign value.

11. The method of claim 10, wherein the at least one processor is further configured to:

search for one or more candidate road sign observations in the first plurality of road sign observations, with corresponding location data lying within a radius of a threshold distance from the actual location of the road sign;

determine one or more primary road sign observations from the one or more candidate road sign observations, having a heading difference with the actual heading of the road sign within a threshold range; and extract the at least second plurality of road sign observations from the one or more primary road sign observations based on the actual road sign value and the actual road sign type.

12. The system of claim 9, wherein the learned location of the road sign is based on the location data of the plurality of vehicles in the first plurality of road sign observations.

13. The system of claim 12, wherein the learned location of the road sign comprises a longitudinal component and a latitudinal component.

14. The system of claim 9, wherein the first plurality of road sign observations further comprises time stamps associated with the first plurality of road sign observations, road sign types of the road sign captured by the plurality of vehicles, and road sign values of the road sign captured by the plurality of vehicles.

15. The system of claim 9, wherein the speed data in the at least second plurality of road sign observations is one of data associated with average speeds of the plurality of vehicles at the road sign, an 85th percentile speed at the road sign, or a speed limit at the road sign.

16. The system of claim 9, wherein the road sign is one of a speed limit sign, a yellow lane marking, an underpass sign, an overpass sign, a road marking, or a lane marking.

17. A computer program product comprising at least one non-transitory computer-readable storage medium having stored thereon computer-executable program code instructions which when executed by a computer, cause the computer to carry out operations for determining a positional offset associated with a location of a road sign, the operations comprising:

obtaining a first plurality of road sign observations of the road sign captured by a plurality of vehicles, wherein the first plurality of road sign observations comprise location data of the plurality of vehicles, heading data of the plurality of vehicles, and speed data of the plurality of vehicles;

computing a plurality of longitudinal offsets between at least a second plurality of road sign observations of the first plurality of road sign observations and ground truth data associated with the road sign;

deriving a function, based on the plurality of longitudinal offsets and the speed data in the at least second plurality of road sign observations;

determining the positional offset associated with the location of the road sign, based on a learned heading and the derived function, wherein the learned heading is based on the heading data of the plurality of vehicles; and generating an updated map to be used by the plurality of vehicles by updating the location of the road sign on a map-matched link, based on a learned location of the road sign and the determined positional offset.

18. The computer program product of claim 17, wherein the operations further comprise:

extracting the at least second plurality of road sign observations from the first plurality of road sign observations based on the ground truth data associated with the road sign, wherein the ground truth data indicates an actual location of the road sign, an actual heading of the road sign, an actual road sign type of the road sign, and an actual road sign value.

19. The computer program product of claim 18, wherein the operations further comprise:

searching for one or more candidate road sign observations in the first plurality of road sign observations, with corresponding location data lying within a radius of a threshold distance from the actual location of the road sign;

determining one or more primary road sign observations from the one or more candidate road sign observations, having a heading difference with the actual heading of the road sign within a threshold range; and extracting the at least second plurality of road sign observations from the one or more primary road sign observations based on the actual road sign value and the actual road sign type.

20. The computer program product of claim 17, wherein the learned location of the road sign is based on the location data of the plurality of vehicles in the first plurality of road sign observations.

* * * * *